2,974,171

PROCESS OF PREPARING 2,6-DI-TERT-BUTYL-4-BENZOYL PHENOL

Thomas H. Coffield, Farmington, Mich., assignor to Ethyl Corporation, New York, N.Y., a corporation of Delaware No Drawing. Filed Dec. 18, 1957, Ser. No. 703,501

2 Claims. (Cl. 260—591)

This invention relates to novel and useful chemical compounds and the preparation and uses thereof. This application is a continuation-in-part of co-pending application, Serial No. 536,314, filed September 23, 1955, now U.S. Patent No. 2,903,487.

Certain 2,6-dialkyl phenols as hereinafter defined have been found to possess the unique capability of forming novel and highly useful metallic salts. Contrary to expectations, these salts are not analogous to metal salts of phenolic compounds such as phenol, o-cresol, 2,6-dimethyl phenol or the like in which the hydrogen atom of the hydroxyl group is replaced by the metallic atom. Instead, in the novel salts of this invention, the metal atom is probably bonded in resonance hybrid form to the para position of the phenol. These novel compounds of this invention open up a new field of chemical reactions involving the para position of the original phenol and consequently lead to the formation of novel and eminently useful chemical compounds. The ensuing description will relate to a detailed consideration of the novel metallic salts of this invention, the preparation thereof, the uses thereof and the novel products which can be readily prepared therefrom.

An object of this invention is to provide novel and useful chemical compounds. Another object is to provide novel and useful metal salts of certain 2,6-dialkyl phenols, which salts are eminently useful in conducting novel chemical reactions. Another object is to provide processes of preparing the novel salts of this invention. Another object is to provide novel and useful chemical reactions involving the novel metallic salts of this invention. A further object is to provide novel and useful chemical compounds which are prepared by novel reactions involving use of the metallic salts of this invention as chemical intermediates. A still further object is to provide improved compositions of matter containing the various novel compounds of this invention. Other important objects of this invention will be apparent from the following description.

According to this invention the above and other objects are accomplished by providing as a new composition of matter a metal salt of a 2,6-dialkyl phenol, said phenol having the formula:

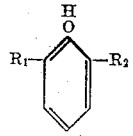

wherein $R_1$ and $R_2$ are tertiary alkyl groups. These groups preferably contain from 4 to 8 carbon atoms and thus comprise tert-butyl tert-amyl, the various tertiary -hexyl, -heptyl and -octyl groups.

Illustrative 2,6-dialkyl phenols as above defined and which are capable of forming the novel metallic salts of this invention include 2,6-di-tert-butylphenol, 2,6-di-tert-amyl phenol, 2,6-di-(1,1,3,3-tetramethylbutyl) phenol, 2-tert-butyl-6-tert-amyl phenol, 2,6-di-(1,1,2,2-tetramethylpropyl) phenol, 2,6 - di - (1-methyl-1-ethyl-amyl) phenol and the like.

The metals which form the phenol salts of this invention are metals which are capable of forming ionic salts with anions of strong acids such as sulfate, nitrate and chloride. Thus, the metallic portion of the novel phenol salts of this invention can be a metal from groups IIB, IIIA, IVA, IVB, VA, VIIB, and VIII. Examples of such metals are: zinc, cadmium, aluminum, tin, lead, titanium, antimony, manganese and iron. However, it is preferable to prepare the novel metallic salts of this invention from metals whose hydroxides are strong bases. Of such metals the alkali metals—lithium, sodium, potassium, rubidium and cesium—and the alkaline earth metals—magnesium, calcium, strontium and barium—are preferred because the phenolic salts of such metals are easily prepared and are particularly valuable as chemical intermediates. From the standpoints of favorable economics and useful reactivity the sodium salts of the above described phenols are most advantageous and are particularly preferred.

The novel metallic salts of 2,6-dialkyl phenols as above described are not easily susceptible of pictorial representation inasmuch as they are evidently the result of resonance hybrid forms. However, these salts act as if the metallic constitutent is substituted in the para position of the phenol. Thus, the metallic salts of this invention may be represented by the following general formula:

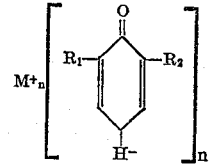

wherein $R_1$ and $R_2$ are tertiary alkyl groups, M is a metal as above described and $n$ is an integer from 1 to 2. Accordingly, the above metal salts of this invention consist of metallic cation and one or two 2,6-di-tert-alkyl cyclohexadienone carbanions. In the case of polyvalent metals such as magnesium, tin, zinc, cadmium, aluminum or the like, the metal salts of this invention comprise three chemical entities, namely, the metallic cation, one or more of the above carbanions and sufficient halide atoms to satisfy the remaining valencies of the metallic cation. Such metallic salts may be represented by the following general formula:

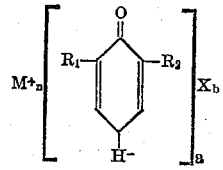

wherein $R_1$ and $R_2$ are tertiary alkyl radicals, M is a polyvalent metal, X is a halogen ion—fluorine, chlorine, bromine and iodine—$n$ is an integrer from 2 to 4 and $a$ and $b$ are integers from 1 to 3, the total of $a$ and $b$ being equal to $n$.

An unusual feature of the compounds of this invention depicted above is that the configuration of the 2,6-di-tert-alkyl cyclohexadienone ions is such that there is a high electron density concentrated at the end of the carbanion opposite to the oxygen atom. Therefore, chemical reactions of these salts are focused upon this para position leading to novel and useful chemical compounds.

The above metal salts of phenols can be preformed—that is, prepared and isolated—and used in chemical reactions, or they can be prepared in situ. In this latter case the novel metallic salts are prepared and subjected to further chemical reaction without isolation.

The novel metal phenolic salts of this invention and their methods of preparation are illustrated by the following examples wherein all parts and percentages are by weight.

Example I

A reaction vessel was equipped with a reflux condenser and stirring means. In this vessel were placed 100 parts anhydrous methanol and 2.3 parts of sodium. When the reaction had subsided 20.7 parts of 2,6-di-tert-butylphenol were added to the reaction mixture and the reflux condenser replaced by a vacuum take-off. A vacuum was applied to the system and the alcohol evaporated while the flask contents were stirred and heated to 80° C. As the evaporation proceeded the contents became viscous and finally solidified. Continued rapid stirring and heating gave the product as a fine light green powder. The last traces of methanol were removed by gently flaming the reaction vessel with a Bunsen burner. The resulting sodium salt of 2,6-di-tert-butylphenol can be stored for long periods of time when maintained under a dry inert gas such as nitrogen. This salt is readily hydrolyzed by water to form 2,6-di-tert-butylphenol and sodium hydroxide.

Example II

The procedure of Example I is repeated in identical manner with the exception that after the addition of the 2,6-di-tert-butylphenol is complete, 300 parts of toluene are added and the methanol removed as a methanol-toluene azeotrope leaving a slurry of the sodium salt of 2,6-di-tert-butylphenol in toluene.

Example III

To a reaction vessel equipped with a condenser, stirring means, reagent introducing means and a nitrogen inlet was added 6.1 parts of magnesium metal, 35.5 parts of methyl iodide and 140 parts of anhydrous diethyl ether. To the resulting solution of methyl magnesium iodide was added slowly with stirring 51.5 parts of 2,6-di-tert-butylphenol dissolved in 35 parts of anhydrous diethyl ether. Methane was evolved. A grayish white precipitate of the magnesium monoiodide salt of 2,6-di-tert-butylphenol was formed. The anhydrous diethyl ether is removed from this salt by vacuum evaporation. The resulting dry salt can be stored under an anhydrous inert gas blanket.

Example IV

To a reaction vessel equipped with stirring means, condensing means, temperature regulating means and inlet means is added 200 parts of anhydrous toluene and 5.6 parts of potassium. Under a dry nitrogen atmosphere the contents of the vessel are heated to reflux and the potassium dispersed by high speed stirring. To the potassium dispersion and at reflux temperature is incrementally added 30 parts of 2,6-di-tert-butylphenol. As the 2,6-di-tert-butylphenol is added hydrogen gas is evolved and removed from the reaction vessel. The potassium salt of 2,6-di-tert-butylphenol is formed.

Example V

To the reaction equipment of Example IV containing 2.2 parts of methyl lithium in 200 parts of diethyl ether is added portionwise 20.7 parts of 2,6-di-tert-butylphenol. Methane is liberated and the lithium salt of 2,6-di-tert-butylphenol formed.

Example VI

To the reaction equipment described in Example IV is added 200 parts of mixed xylenes, 2.1 parts of calcium hydride and the mixture heated to reflux. 20.7 parts of 2,6-di-tert-butylphenol are added incrementally to the refluxing mixture and heating continued until hydrogen evolution has ceased. The product of this reaction, the calcium salt of 2,6-di-tert-butylphenol, contains two 2,6-di-tert-butylcyclohexadienone carbanions per atom of calcium. This salt is an insoluble solid which separates readily from the xylenes.

Example VII

To the reaction vessel of Example IV is added 300 parts of toluene and 4.25 parts of dimethyl zinc. To the resulting solution is added 23.4 parts of 2,6-di-tert-amyl phenol. Methane gas, which is evolved, is removed from the reaction vessel as formed. The product of this reaction is the zinc salt of 2,6-di-tert-amyl phenol which contains two 2,6-di-tert-amyl cyclohexadienone carbanions per atom of zinc. It is separated from the toluene by filtration under an inert anhydrous atmosphere.

Example VIII

The apparatus of Example IV is charged with 300 parts of toluene containing 8.5 parts of diethyl cadmium. The mixture is heated to reflux and 31.8 parts of 2,6-di-(1,1,3,3-tetramethylbutyl) phenol incrementally added. When evolution of ethane has ceased the mixture is cooled and the product obtained by filtration. The cadmium salt of 2,6-di-(1,1,3,3-tetramethylbutyl) phenol contains two 2,6-di-(1,1,3,3-tetramethylbutyl) cyclohexadienone carbanions per atom of cadmium.

Example IX 24 parts of the sodium salt of 2,6-di-tert-butylphenol suspended in 200 parts of toluene is prepared according to the procedure of Example I. This suspension is then introduced into the reaction vessel of Example IV. To this suspension is added 9.5 parts of titanium tetrachloride while maintaining the contents of the vessel under a blanket of inert anhydrous nitrogen gas. The temperature of the reactants is maintained at a temperature below 50° C. The titanium dichloride salt of 2,6-di-tert-butylphenol is formed.

Example X

Dicyclopentadienyl manganese is prepared by the method of E. O. Fischer and R. Jira, Zeitschrift fur Naturforschung 9B, 618–19 (1954). Using the reaction equipment of Example IV 18.5 parts of dicyclopentadienyl manganese suspended in 200 parts of hexane is reacted with 20.7 parts of 2,6-di-tert-butylphenol. This phenol is added portionwise to the suspension which is maintained at reflux temperature. The solvents and the resultant cyclopentadiene are removed by vacuum distillation to yield the manganese salt of 2,6-di-tert-butylphenol.

Example XI

Using the apparatus of Example IV 3.9 parts of sodamide is suspended in 150 parts of octane and 22.0 parts of 2-tert-butyl-6-tert-amyl phenol slowly added at reflux temperature. The preparation of the sodium salt is complete upon the completion of the evolution of ammonia. The sodium salt of 2-tert-butyl-6-tert-amyl phenol is then separated from the octane by filtration under an inert anhydrous atmosphere of nitrogen.

The above examples are illustrative of the novel metallic salts of this invention and the methods for the preparation thereof. Other modes of preparing the compounds of this invention will now be apparent to those skilled in the art.

It can be seen from the preceding examples that the novel metallic salts of this invention can be prepared by a variety of methods. Generally speaking, the alkali metal salts of this invention are best prepared by reacting an alkali metal alkoxide with an appropriate 2,6-di-tert-alkyl phenol. If desired, recourse may be had to reaction between such phenol and a suspension or dispersion of the alkali metal, an organo alkali metal compound such as phenyl sodium, amyl sodium, ethyl lithium, methyl potassium or the like, or inorganic alkali metal compounds such as the hydrides or amides. The same general methods are also applicable to the preparation of the alkaline earth metal salts of this invention. In the case of the magnesium salts of this invention, the most efficacious method involves reaction between a standard Grignard reagent and a 2,6-di-tert-alkyl phenol. Thus, a facet of this invention is the provision of a novel process for preparing the novel metallic salts of this invention. This process comprises reacting a 2,6-di-tert-alkyl phenol with a member selected from the class consisting of (1) Grignard reagents, (2) alkaline earth metal hydrides, (3) alkali metals, and (4) compounds having the formula:

MR wherein M is an alkali metal and R is selected from the group consisting of hydrogen, amide, alkyl and aryl.

To demonstrate the unique and surprising chemical reactions which the novel metallic salts of this invention undergo comparative experiments were conducted on the cyanoethylation of the sodium salt of 2,6-dialkyl phenols. In one instance, the sodium salt of 2,6-diisopropyl phenol was reacted with acrylonitrile yielding an oxygen-alkylated product. In the case of the cyanoethylation of the sodium salt of 2,6-di-tert-butyl phenol, a para-alkylated product was obtained. This striking difference in mode of reaction will be further apparent from the following specific examples in which all parts and percentages are by weight.

*Example XII*

The sodium salt of 2,6-diisopropyl phenol was made by adding 17.8 parts of 2,6-diisopropyl phenol to a solution of 2.3 parts of sodium in 120 parts of methanol. The methanol was evaporated by applying a vacuum to the reaction vessel and the last traces removed by heating the salt remaining in the vessel. Next was added 26.7 parts of 2,6-diisopropyl phenol and while stirring 100 parts of acrylonitrile was added portionwise. The mixture was then heated at 50° C. for two hours, poured into 500 parts of cold water, extracted with ether, dried over magnesium sulfate and the ether evaporated leaving a reddish-brown solid. This product was recrystallized from isooctane giving a grayish white solid which on recrystallization from ethanol yielded white needles melting from 94.5 to 96° C. The infra-red spectrum revealed this product to be $\beta$-(2,6-diisopropylphenoxy) propionitrile.

*Example XIII*

The sodium salt of 2,6-di-tert-butylphenol was prepared by the reaction of 2,6-di-tert-butylphenol with sodium methylate and the resultant methanol removed under vacuum. To this dry salt was added 47 parts of 2,6-di-tert-butylphenol and 106 parts of acrylonitrile. A clear dark green solution resulted. This solution was stirred at 50° C. for four hours, cooled and allowed to stand for 16 hours. The contents of the reactor were thoroughly washed with cold water, and the organic layer was separated, dried over magnesium sulfate and the solution evaporated. The residue from this evaporation was subjected to fractional crystallization from petroleum ether to give white needles melting at 111 to 113°. The infra-red spectrum showed this material to be $\beta$-(3,5-di-tert-butyl-4-hydroxyphenyl) propionitrile. Chemical analysis showed: carbon, 78.80 percent; hydrogen, 9.78 percent.

It will be readily apparent from Examples XII and XIII that the modes of reactions were very different when using a salt of this invention (Example XIII) compared with a metallic salt not of this invention (Example XII). This difference in mode of reactivity demonstrates that the metallic salts of this invention behave during chemical reaction as if the metallic portion thereof were substituted in the position of the 2,6-di-tert-alkyl cyclohexadienone carbanion opposite to the carbonyl group. Thus, the novel salts of this invention are markedly different from the corresponding metallic salts of phenols which do not contain tertiary alkyl groups in both positions ortho to the hydroxyl group. In these latter salts the metal replaces the hydrogen atom of the hydroxyl group to form conventional metallic phenoxide salts having metal-to-oxygen bonds.

The totally unexpected mode of reactivity of a novel metal salt of this invention described in Example XIII is exhibited by the other metal salts of this invention. For example, by subjecting the alkali metal salts of 2,6-di-tert-alkyl phenols to cyanoethylating conditions, the corresponding para-cyanoethylated phenols are obtained.

To still further demonstrate the remarkable properties of the metallic salts of this invention in making possible reactions involving the para positions of the starting phenols, comparative experiments were conducted on benzoylation of different phenols. In one case the sodium salt of 2,6-diisopropyl phenol was reacted with benzoyl chloride. Benzoylation occurred at the oxygen atom. In the second case, involving use of the sodium salt of 2,6-di-tert-butyl phenol—a compound of this invention—benzoylation occurred on the ring opposite to the carbon atom to which is attached the oxygen atom. The striking dissimilarity between these reactions will be further apparent from the following specific examples wherein all parts and percentages are by weight.

*Example XIV*

In a reaction vessel equipped with a high speed stirrer, reflux condenser, inlet means, thermometer, and nitrogen sweep were placed 300 parts of dry dioxane and 2.3 parts of sodium. The contents of the vessel were brought to reflux at 101° and the sodium dispersed by rapid stirring under nitrogen. The dispersion was cooled to 60° and 17.5 parts of 2,6-diisopropyl phenol in 30 parts of dioxane slowly added over a 0.5 hour period. A slow evolution of hydrogen was noted. The mixture was heated to 100° and after 20 minutes no further hydrogen evolution was observed. The mixture was cooled to 58° and to it was added over a 5 minute period 14 parts of benzoyl chloride. The temperature rose to 64° and a gelatinous precipitate formed. The mixture was allowed to stand for 16 hours and then filtered to remove inorganic solids. Evaporation taken up in ether, the ether solution washed with 10 percent aqueous sodium hydroxide, dried over sodium sulfate, and evaporated. The resultant oil readily crystallized from water-ethanol solution (40:150) to give 18.4 parts of 2,6-diisopropyl phenylbenzoate, M.P. 70–72°. The structure of this compound was established by means of its infra-red spectrum. Analysis: calculated for $C_{19}H_{22}O_2$: carbon 80.81 percent, hydrogen 7.9 percent. Found: carbon 80.9 percent, hydrogen 8.2 percent.

*Example XV*

The sodium salt of 2,6-di-tert-butylphenol was prepared by reacting 120 parts of anhydrous methanol with 5.7 parts of sodium to form sodium methylate which in turn was reacted with 52 parts of 2,6-di-tert-butyl phenol. Excess methanol was removed from the reaction vessel by the application of heat. To the dry sodium salt of 2,6-di-tert-butyl phenol was added 300 parts of dioxane and the resulting slurry heated to 60° C. To this slurry was added portionwise over a period of one minute, 33 parts of benzoylchloride dissolved in 25 parts of dioxane. A rapid reaction occurred causing the temperature to rise to 80° C. The contents of the reaction vessel varied in appearance from a green to a yellowish color. The temperature was reduced to 25° C. while stirring. The mixture was then washed with water, ether added, the organic layer separated and dried over sodium sulfate. Evaporation at reduced pressure gave a brown viscous oil from which was recovered a cream colored solid melting from 120 to 125° C. This solid crystallized from ligroin to yield a product having a melting point of 124 to 126° C. The infra-red spectrum showed the compound to be 2,6 - di - tert - butyl-4-benzoyl phenol. Analysis showed 81.20 percent of carbon and 8.53 percent of hydrogen whereas the empirical formula $C_{21}H_{26}O_2$ required 81.25 percent of carbon and 8.44 percent of hydrogen.

By referring to Examples XIV and XV it is readily apparent that once again the course of the respective reactions was decidedly different. When a metallic salt of 2,6-di-isopropyl phenol was used, benzoylation reaction occurred at the oxygen atom. On the other hand, when a metallic salt of this invention, namely, the sodium salt a 2,6-di-tert-butyl phenol, was employed, the benzoylation occurred not on the oxygen atom as would be expected, but occurred on the ring of the phenol. This further demonstrates the novel structure and characteristics of the metal salts of this invention and the novel reactions which they undergo.

The unexpectedly altered course of the reaction using a metal salt of this invention as described in Example XV is encountered when reacting other metal salts of this invention with other acid halides. For example para-substituted 2,6-di-tert-alkyl phenols are formed when such salts as the potassium salt of 2,6-di-tert-butylphenol, the sodium salt of 2,6-di-(1,1,3,3-tetramethylbutyl) phenol and the lithium salt of 2,6-di-tert-amyl phenol are reacted with such compounds as acetyl bromide, propionyl chloride, crotonyl bromide and the like.

It will now be appreciated by those skilled in the art that by making available the novel metallic salts of this invention novel chemical reactions have now been made available for the first time. For example, the novel metallic salts of this invention readily undergo reaction with organic halides such as propyl bromide, hexyl chloride, isopropyl bromide, sec-butyl chloride, isobutyl iodide, benzyl chloride, allyl bromide, etc.; acid halides such as acetyl chloride, propionyl bromide, crotonyl chloride, phosgene, benzoyl bromide, etc.; inorganic halides such as phosphorus trichloride, phosphoryl bromide, phosphoryl chloride, sulfur dichloride, silicon tetrachloride, titanium tetrachloride, manganous chloride, lead tetrachloride, etc.; acid anhydrides such as acetic anhydride, succinic anhydride, benzoic anhydride, etc.; cyclic oxides and sulfides such as ethylene oxide, 1,2-propylene oxide, 1,2-butylene oxide, 2,3-butylene oxide, styrene oxide, 1,2-propylene sulfide, ethylene sulfide, etc.; cyclic imines such as ethylene imine, N-phenyl-ethylene imine, 1,2-propylene imine, etc.; organic sulfate esters such as dimethyl sulfate, diethyl sulfate, etc.; organic phosphorus halides such as phenyl phosphorus dichloride, butyl phosphorus dibromide, o,o-di-(xylyl) phosphoryl chloride, o,o-di(p-tolyl) phosphoryl chloride, etc.; and the like.

The products readily prepared by employing the metal salts of this invention as chemical reactants or intermediates are useful in the chemical arts. For example, many of the compounds prepared from the metal salts of this invention are themselves particularly useful as chemical intermediates for antioxidants, germicidal preparations, wetting agents, and the like. Thus, the compounds prepared by reaction between metal salts of this invention and acrylonitrile possessing a cyano group are readily susceptible of chemical reactions with Grignard reagents, reducing agents, or can be readily subjected to hydrolysis leading to novel and useful products. Particularly good antioxidants are prepared by reacting the metal salts of this invention with organic halides or with acid halides. The resulting products are very effective in inhibiting the oxidative deterioration of gasoline, lubricating oil, tetraethyllead and other organometallic compounds, industrial oils, plastics, natural and synthetic rubber, high molecular weight polymers, greases, waxes, edible fats and oils and the like. Products derived from the salts of this invention which contain metal or metalloid elements such as silicon and titanium are readily adapted to use as copolymerizing agents in the formulation of resins and other useful polymers. Other applications of the products derived from the metal salts of this invention will now be apparent to those skilled in the art.

The outstanding utility of products made from the metal salts of this invention was illustrated by carrying out a series of standard antioxidant tests on gasoline. In one instance, an antioxidant-free gasoline having an induction period of 95 minutes according to ASTM Test Procedure D525–46 (see part IIIA, ASTM Standards for 1946) was treated with $\beta$-(3,5-di-tert-butyl-4-hydroxyphenyl) propionitrile so that the resultant fuel contained four milligrams of this compound per 100 milliliters. When this finished gasoline was subjected to the above ASTM test procedure, it was found that the induction period was over 250 percent as long as the induction period of the same gasoline when devoid of the propionitrile. This test shows that when small amounts of $\beta$-(3,5-di-tert-butyl-4-hydroxyphenyl) propionitrile are blended with gasolines—which may be clear or leaded—unusually great resistance against oxidative deterioration is provided. In the same manner, it has been found that small amounts—e.g., less than one percent by weight—of 2,6-di-tert-butyl-4-benzoyl phenol in various gasolines likewise provide significant protection against oxidative deterioration.

I claim:

1. Process for the preparation of 2,6-di-tert-butyl-4-benzoyl phenol which comprises reacting the sodium salt of 2,6-di-tert-butyl phenol with a benzoyl halide.

2. Process for the preparation of 2,6-di-tert-butyl-4-benzoyl phenol which comprises reacting the sodium salt of 2,6-di-tert-butyl phenol with benzoyl chloride in dioxane as a solvent.

References Cited in the file of this patent

Auwers et al.: Ber. Deut. Chem., vol. 41, p. 2339 (1908).

Stillson et al.: J. Am. Chem. Soc., vol. 67, pp. 303–307 (1945).